(12) United States Patent
Reid et al.

(10) Patent No.: US 9,494,339 B2
(45) Date of Patent: Nov. 15, 2016

(54) SOLAR COLLECTOR

(75) Inventors: John Reid, County Tyrone (GB); Patrick Robert Davis, County Down (GB); Paul Thomas McEntee, Belfast (GB); William Hadden, Belfast (GB)

(73) Assignee: Kingspan Holdings (IRL) Limited, Kingscourt, County Cavan (IE)

(*) Notice: Subject to any disclaimer, the term of this patent is extended or adjusted under 35 U.S.C. 154(b) by 627 days.

(21) Appl. No.: 13/823,488

(22) PCT Filed: Sep. 9, 2011

(86) PCT No.: PCT/IE2011/000050
§ 371 (c)(1),
(2), (4) Date: Jun. 17, 2013

(87) PCT Pub. No.: WO2012/035525
PCT Pub. Date: Mar. 22, 2012

(65) Prior Publication Data
US 2013/0263844 A1 Oct. 10, 2013

(30) Foreign Application Priority Data
Sep. 17, 2010 (IE) .................................. 20120/0588

(51) Int. Cl.
| F24J 2/32 | (2006.01) |
| F24J 2/05 | (2006.01) |
| F24J 2/26 | (2006.01) |
| F24J 2/46 | (2006.01) |

(52) U.S. Cl.
CPC  *F24J 2/32* (2013.01); *F24J 2/055* (2013.01); *F24J 2/26* (2013.01); *F24J 2/4647* (2013.01); *Y02B 10/22* (2013.01); *Y02E 10/44* (2013.01)

(58) Field of Classification Search
CPC .............. F24J 2/055; F24J 2/26; F24J 2/4647; F24J 2/32; Y02E 10/44; Y02B 10/22
See application file for complete search history.

(56) References Cited

U.S. PATENT DOCUMENTS 4,033,327 A * 7/1977 Pei ........................... F24J 2/055
126/608

FOREIGN PATENT DOCUMENTS

| DE | 10011812 | 9/2001 |
| DE | 20216789 | 1/2003 |
| EP | 0 053 852 | 6/1982 |
| GB | 2 103 350 | 2/1983 |
| GB | 2 449 766 | * 3/2008 |

(Continued)

*Primary Examiner* — Alfred Basichas
(74) *Attorney, Agent, or Firm* — Harness, Dickey & Pierce, P.L.C.

(57) ABSTRACT

A solar collector comprises a solar absorbing tube comprising enclosure enclosing an absorbing section, comprising a radiation absorbing plate and a tube, containing a working fluid in thermal contact with the plate. The tube extends out of one end of the tube and connects with a condenser wherein the thermal transfer fluid when in a vapor phase communicates with a fluid to be heated within an end fitting. The condenser of a tube is inserted into a thermal pocket sealingly engaged with a gasket within the pipe receiving portion of the fitting, whereby heat transfer can take place between the condensers of the pipes and a fluid flowing via path in the fitting. The pocket is sealed against ingress of heat exchange fluid flowing through the fitting.

17 Claims, 9 Drawing Sheets

(56) References Cited

FOREIGN PATENT DOCUMENTS

GB        2 448 040     10/2008
WO     2008/146269    12/2008

\* cited by examiner

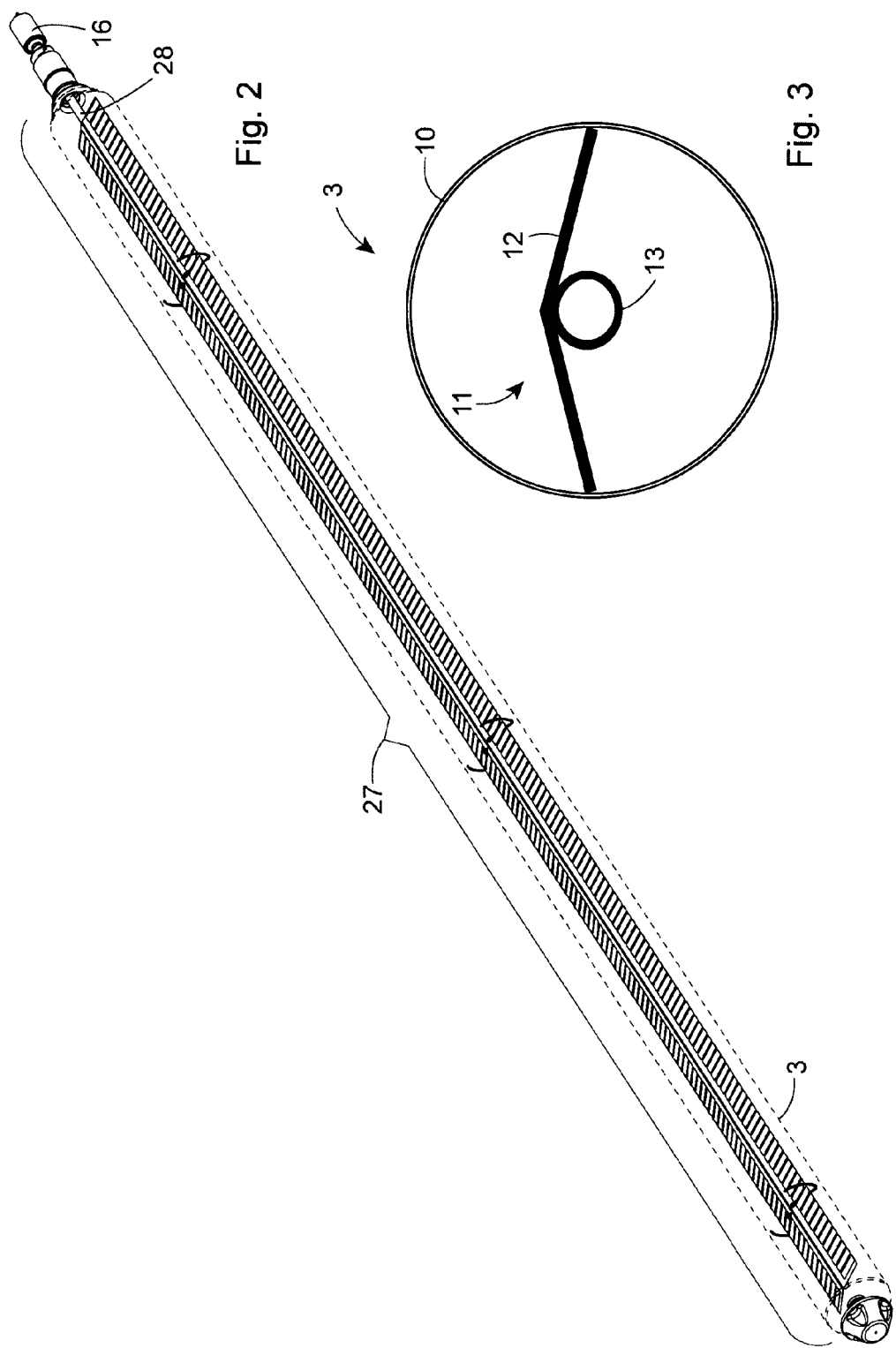

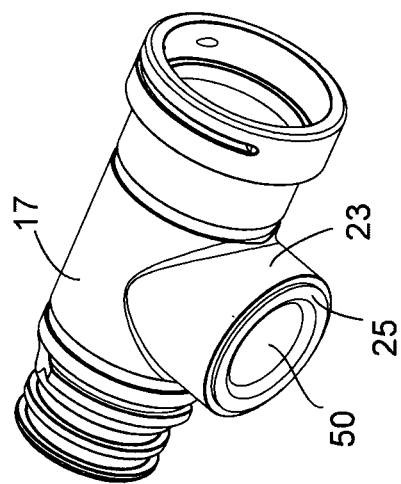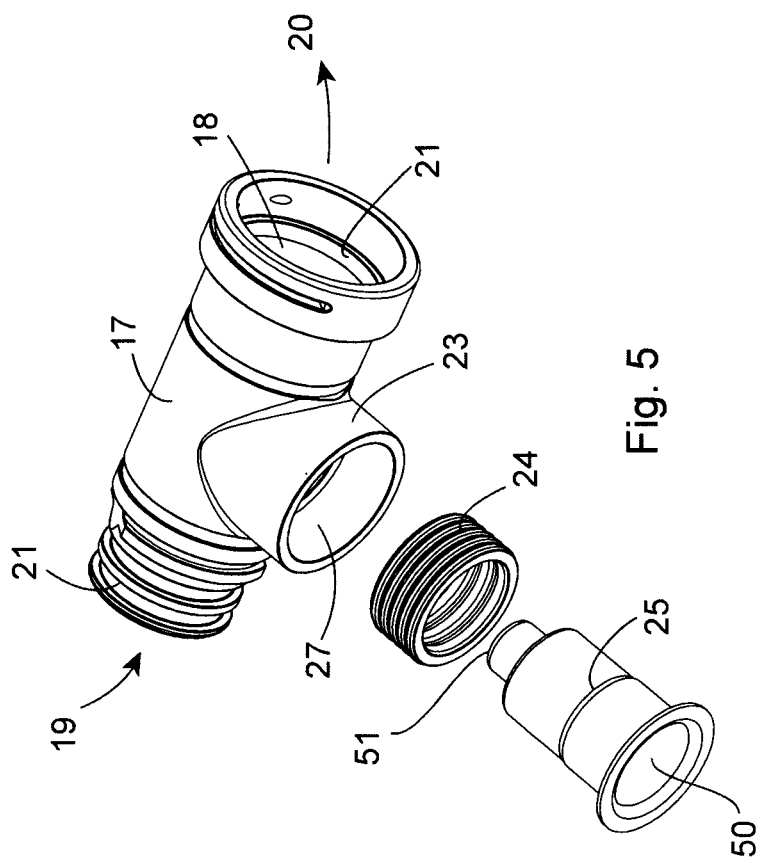

SOLAR COLLECTOR

INTRODUCTION

The invention relates to a solar collector for converting solar radiation into heat and to transfer the latter with the maximum possible efficiency to a fluid heat transferring means (e.g. water or air) whereby the heat can be utilised in a domestic or industrial application, for example to heat a domestic hot water or a central heating system.

A solar collector typically comprises a number of elongate tubes containing a radiation absorbing plate for absorbing solar radiation in contact with a pipe through which the fluid to be heated can be passed or within which is contained a working fluid for transferring heat to the fluid to be heated. The radiation absorbing plate and at least a portion of the pipe are enclosed within an evacuated radiation transparent enclosure to prevent heat loss.

In one type of solar collector, known as a heat pipe type, the pipe forms a closed chamber and contains a working fluid. The pipe defines an evaporator section, in thermal contact with the radiation absorbing plate, and a condenser section remote from the plate. The plate and the evaporator section of the elongate tube are enclosed within the evacuated radiation transparent enclosure to prevent heat loss. The condenser section is placed in thermal contact with the fluid to be heated to allow heat transfer between the working fluid and the fluid to be heated.

The heat pipe type of collector utilises the phase change of the working fluid to achieve greater efficiency. The energy which is required for the flow of the working fluid is provided by gravity so that no external pumping source is necessary. A known heat pipe type solar collector is described in GB2103350A.

A solar collector of the heat pipe type also comprises a heat collection manifold containing a fluid to be heated and having at least one solar tube-receiving aperture therein for insertion of one end of each elongate tube to permit heat transfer between the working fluid within the condenser section of the pipe and the fluid to be heated. The manifold is typically provided with inlet and outlet connections.

The separate elongate tubes and the heat collection manifold of the solar collector need to be capable of being readily assembled on site and designed so that they are capable of taking up the tolerances which are usual in this field of the technology without risk of damage or leakages. In addition, it is necessary that these component parts be easily replaceable. To date the traditional solar collector manifold has typically had a fixed number of receiving apertures as shown in FIG. 1. A traditional solar collector 1 comprises a manifold housing 2, a plurality of elongate tubes 3 and a support structure 4. The manifold is typically provided with an inlet port 5 and an outlet port 6 to allow the flow of the fluid to be heated. A plurality of inlet apertures 7 is also provided to allow the insertion of the elongate tubes 3 into the manifold 2. The restrictive design of such traditional solar thermal collectors has limited the flexibility of the solar collector for various applications. Traditional manifolds are fixed in their dimensions and the number of solar tubes that they can accommodate.

A modular type of collector that addressed the limitations of traditional collector design by providing a solution that is flexible to allow a collector to be constructed with any number of solar tubes and the size of which is not limited to the design and construction of the manifold is described in WO2008/146269A and an example is illustrated in FIG. 4. This modular collector 8 comprises a plurality of elongate tubes 3 each with an individual end fitting 9 and a support structure 4. The modular collector 8 is typically provided with an inlet port 5 and an outlet port 6 to allow the flow of fluid to be heated. The modular nature of this collector is such that the collector can be constructed from any number of modular elongate tubes 3 to assemble a collector array of variable size and area.

STATEMENTS OF INVENTION

According to the invention there is provided a solar collector comprising a heat pipe having a radiation absorbing means for absorbing solar radiation and an elongate tube for containing a heat transfer medium, the elongate tube having an evaporator section in thermal contact with the radiation absorbing means and a condenser section remote from the radiation absorbing means, the radiation absorbing means and the evaporator section of said elongate tube being enclosed within an evacuated radiation transparent enclosure and the condenser section being located outside the transparent enclosure, and an end fitting providing fluid connection means for connecting with a corresponding end fitting of an adjacent heat pipe to permit passage of fluid between the end fittings without requiring a separate manifold, wherein the end fitting comprises a thermal pocket to receive the condenser section of the heat pipe. The thermal pocket is sealed against fluid ingress. The connection between the solar collector tube and the pocket is dry—there is no fluid flow through the pocket. Thus a solar collector tube can be readily removed and replaced.

In one embodiment the end fitting comprises a socket to receive the thermal pocket. The thermal pocket may comprise a retaining flange. The thermal pocket preferably comprises a cylindrical housing for reception of the condenser section of the heat pipe. The condenser section may be a tight fit in the thermal pocket for heat transfer from the condenser section to the thermal pocket.

In a preferred embodiment the thermal pocket is of a heat conductive material such as copper.

In one embodiment the solar collector comprises sealing means between the socket of the end fitting and the thermal pocket. The sealing means may comprise a ring member of resilient polymeric material. The sealing means may comprise a plurality of sealing projections.

In one case the socket of the end fitting comprises a recess for receiving the sealing means. The recess may be of cylindrical form for reception of a cylindrical sealing means.

In one embodiment the end fitting comprises a fluid passageway, the end fitting being adapted to sealingly engage a similar passageway of an adjacent end fitting. The end fitting may comprise a seal for sealingly engaging the passageways of adjacent end fittings. The end fitting may comprise a groove or recess to receive an O-ring seal.

In one embodiment said end fitting is provided at one end of each elongate member.

In one case the end fitting comprises a fluid passageway, the end fitting being adapted to sealingly engage a similar passageway of an adjacent end fitting.

Preferably the end fitting comprises a seal for sealing engaging the passageways of adjacent end fittings. The end fitting may comprise a groove or recess for receiving an O-ring seal.

In one embodiment the end fitting comprises a receiving portion for receiving a thermal pocket into which will be inserted the condenser section of a solar collector tube. The receiving portion may extend substantially orthogonally to the fluid passageway.

In one case the receiving section is adapted for sealingly engaging with a thermal pocket. In one case the thermal pocket is sized and adapted for close engagement with the condenser section of a solar collector tube to facilitate effective thermal transfer between the condenser section and the thermal pocket.

The receiving section may comprise a smooth face for engaging a seal or a seal for sealing engaging with a thermal pocket. The seal may comprise an O-ring or a Gasket.

In one embodiment the solar collector comprises a protective casing for receiving the end fitting and an end of the solar collector tube. The end fitting and/or the end of the solar collector tube are preferably releasably engageable in the protective casing.

In one case the protective casing comprises a main protector body and a closure part which is movably mounted to or removable from the main protector body. The protective casing may comprise a removable end cap. Preferably the protective casing comprises a hinged or pivotal lid part.

In one embodiment the protective casing comprises a receiver for receiving a locking clip for securely mounting the solar collector tube and/or the associated end fitting in the protective housing.

The protective casing may comprise a support structure. The support structure may be integral with the protective housing.

In one case the support structures of adjacent protective casings are interlinkable. Adjacent support structures may be interlocked by an interlink component. At least part of the interlink component may be integral with the support structure. The interlink component may be separate or separable from the support structure.

The invention also provides a solar collector assembly comprising a plurality of similar solar collectors of the invention.

Preferably each elongate member includes connection means to enable the elongate member to be connected to a supporting structure.

Preferably each fluid connection means preferably includes one or more seal means, such as an o-ring or a compression fitting.

Preferably said absorbing means of each elongate tube comprises a radiation absorbing surface, such as a plate, enclosed within an evacuated radiation transparent enclosure formed from a radiation transparent material, such as glass.

Preferably the fluid connection means is formed on an end fitting provided on one or both ends of the evacuated tube of each elongate tube. Preferably said supporting structure connecting means are provided on each end fitting. In one embodiment said supporting structure connecting means comprises one or more channel sections arranged transverse to the longitudinal axis of each elongate tube.

In a preferred embodiment, the fluid connection means comprises a tubular opening adapted to sealingly engage a similar tubular opening on an adjacent elongate tube. An o-ring seal may be provided between the tubular openings of adjacent elongate tubes to prevent fluid leakage.

In one embodiment, said radiation absorbing surface of each elongate member is in thermal contact with an elongate tube having at least one internal flow passageway for the flow of said fluid to be heated, said at least one internal flow passageway communicating with said fluid connection means.

Preferably said radiation absorbing surface of each elongate member is in thermal contact with an evaporator section of a heat pipe comprising an elongate tube containing a heat transfer medium, a second section of said elongate tube, defining a condenser section of the heat pipe, being in thermal contact with a thermal pocket that is in contact with a fluid chamber defined within said elongate member, preferably within said end fitting, and communicating with said fluid connection means to enable heat transfer between said fluid to be heated and said heat transfer medium.

In such embodiment, said fluid chamber of each elongate member may be defined by a passage extending through said end fitting having an opening at either end thereof to define said fluid connection means for fluid communication with a corresponding fluid chamber of adjacent elongate members, the condenser section of the elongate tube passing into a thermal pocket that forms a wall portion of said fluid chamber to permit heat transfer between fluid within said chamber and a working fluid within said condenser section.

The present invention combines a number of previously separate components and therefore reduces the overall complexity of the solar collector resulting in lower cost and material usage without any compromise in the efficiency, ease of assembly and reliability of the solar collector.

BRIEF DESCRIPTION OF THE DRAWINGS

Preferred embodiments of the present invention will now be described, by way of example only, with reference to the accompanying drawings, in which:

FIG. 2 is a perspective view of one tube of the collector of FIG. 1;

FIG. 3 is a cross-sectional view the tube of FIG. 2;

FIG. 5 is an exploded perspective view of the hydraulic components according to a first embodiment of the invention with an end fitting comprising a thermal pocket, a sealing gasket and a fluid chamber for a dry heat-pipe of the type illustrated in FIG. 2;

FIG. 6 is a perspective view of the assembled end fitting components shown in FIG. 5;

DETAILED DESCRIPTION

Figure 1:
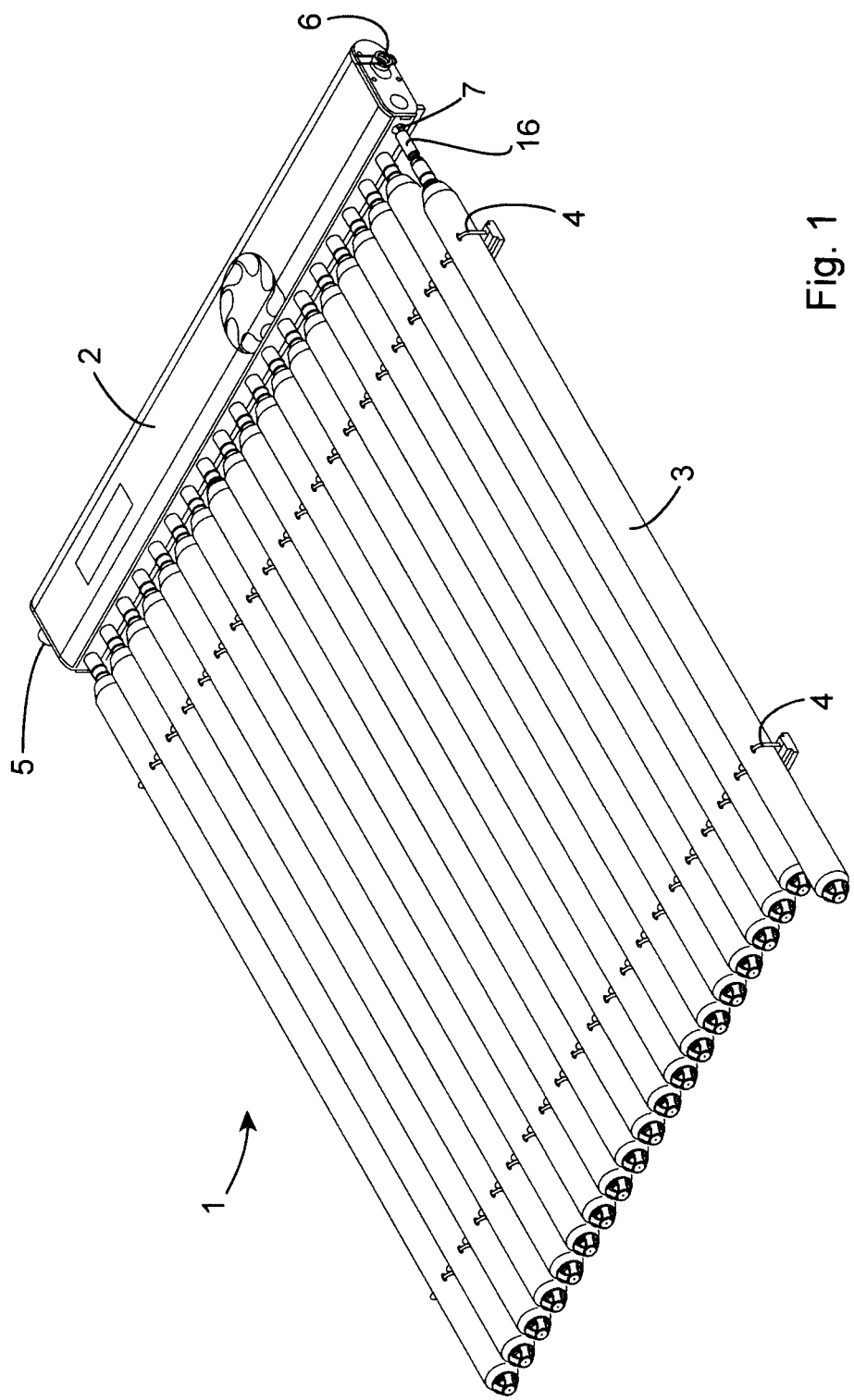
FIG. 1 is a perspective view of a prior art solar collector of the heat pipe type.
Figure 4:
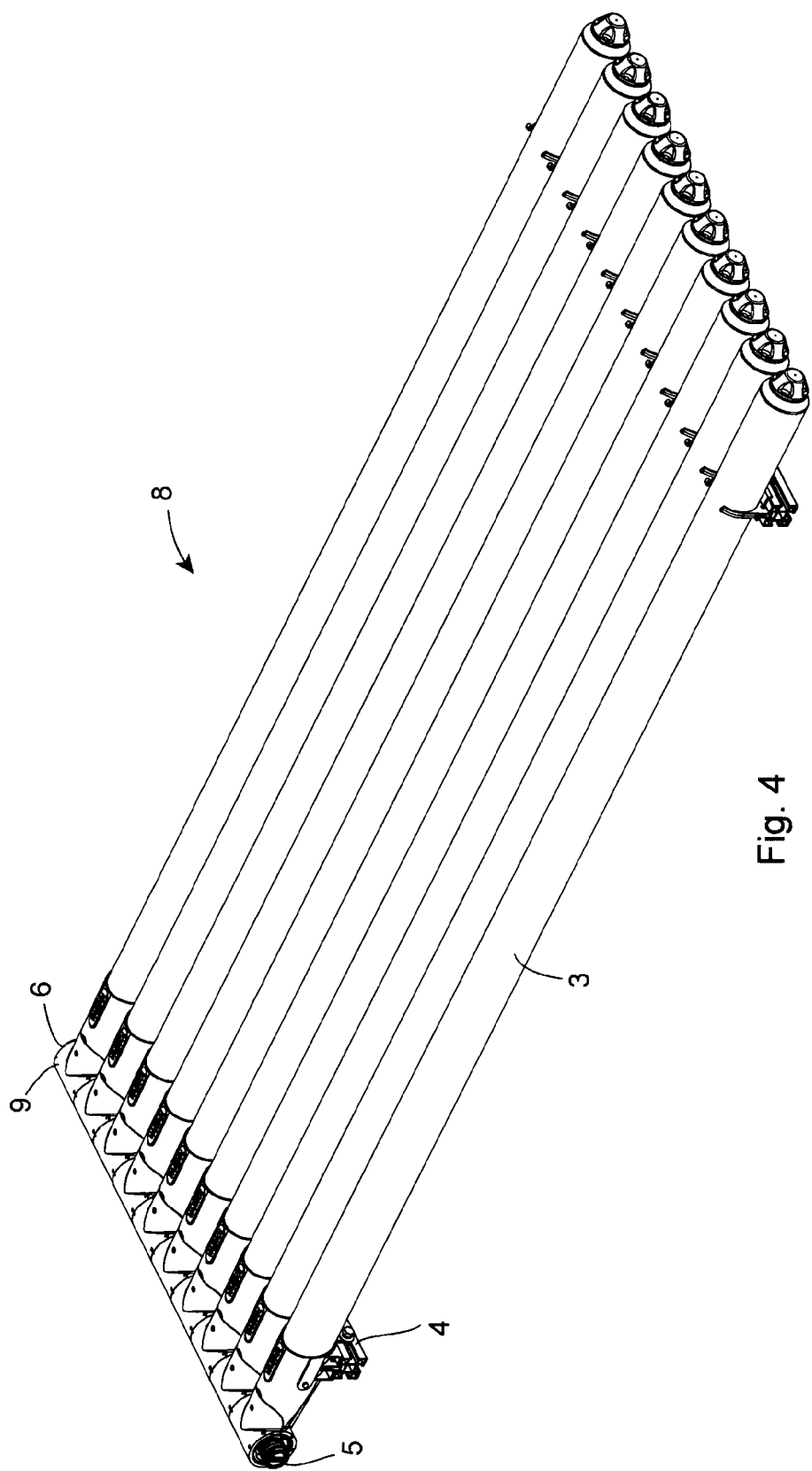
FIG. 4 is a perspective view of a modular solar collector.
Figure 8:
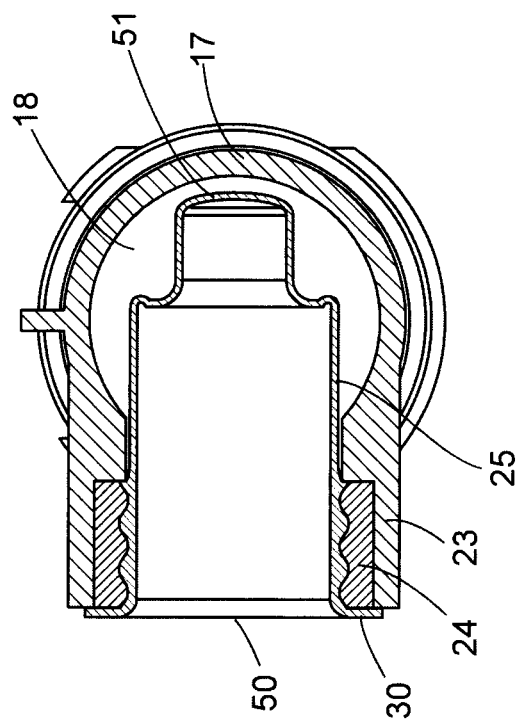
FIG. 8 is a cross sectional view of the assembled end fitting of FIG. 6.
Figure 7:
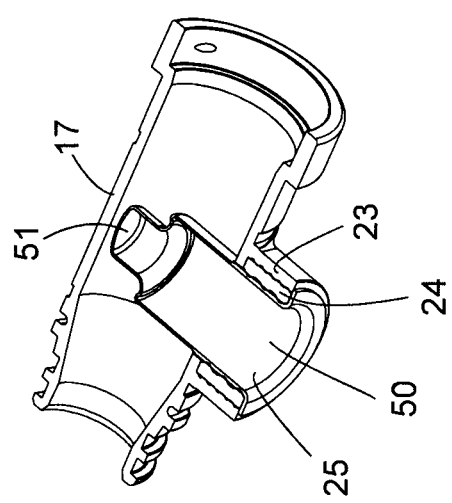
FIG. 7 is a cross-sectional perspective view of the assembled end fitting of FIG. 6.
Figure 9:
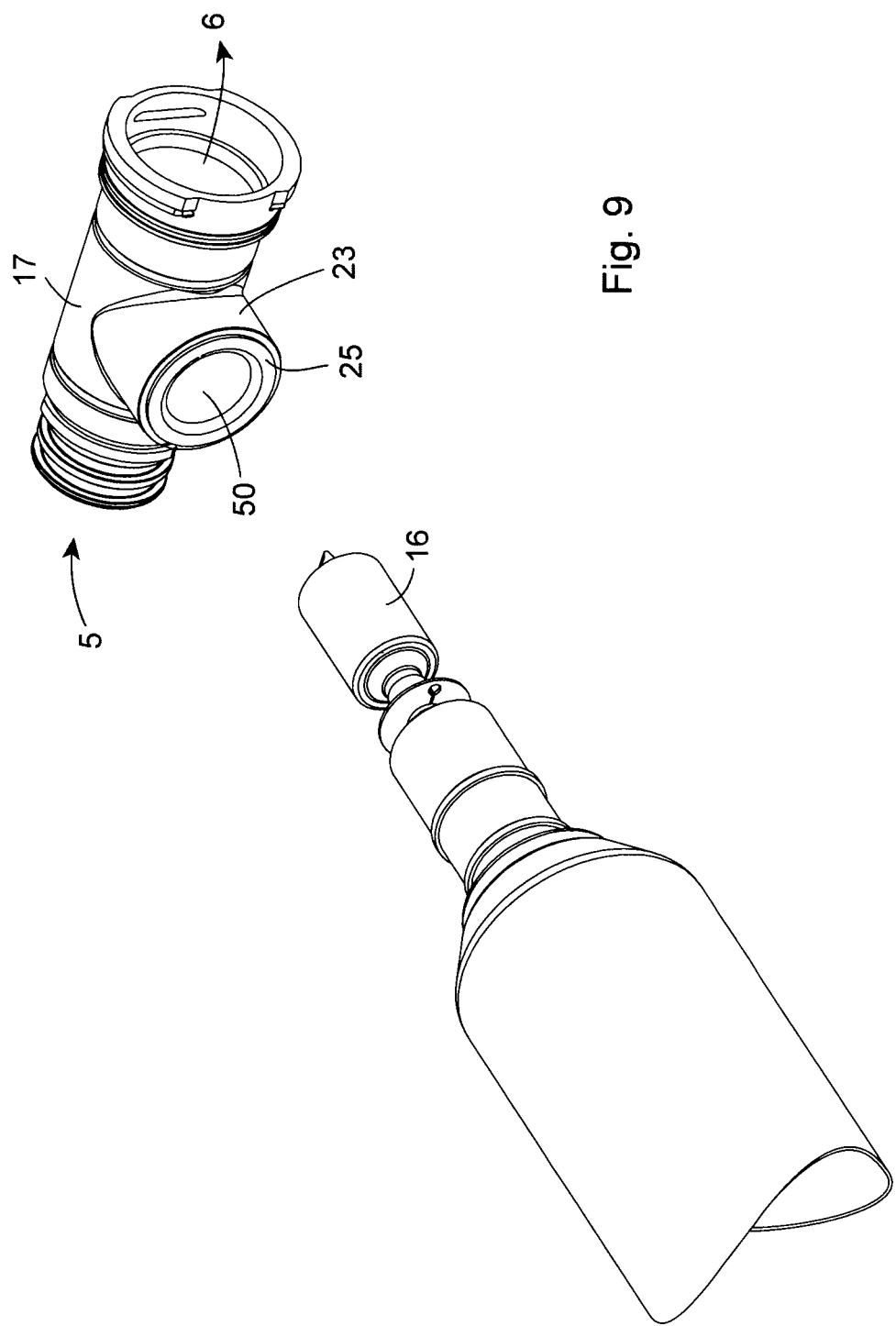
FIG. 9 and 10 are perspective views of a dry heat-pipe type tube being assembled and secured into the end fitting.
Figure 10:
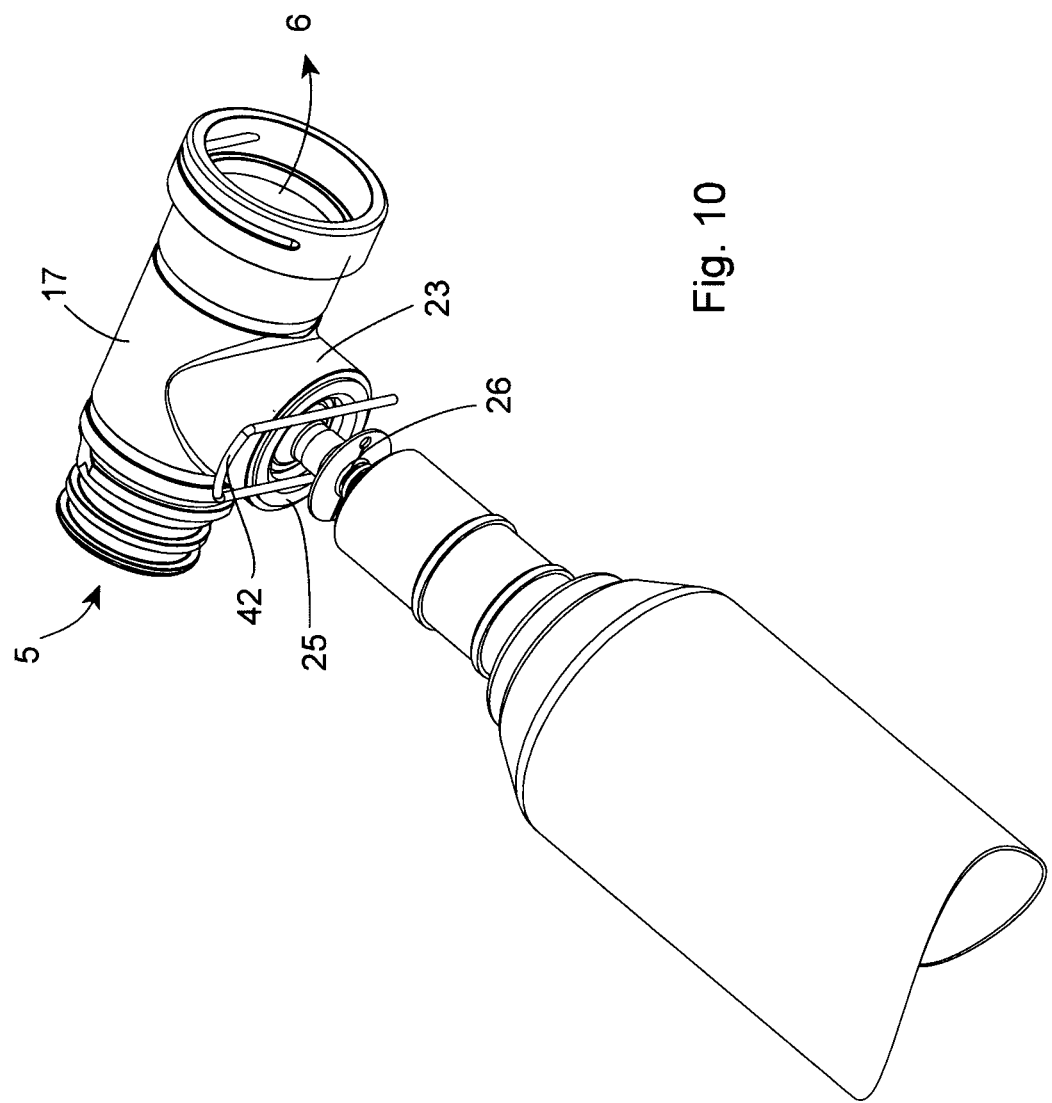
Figure 11:
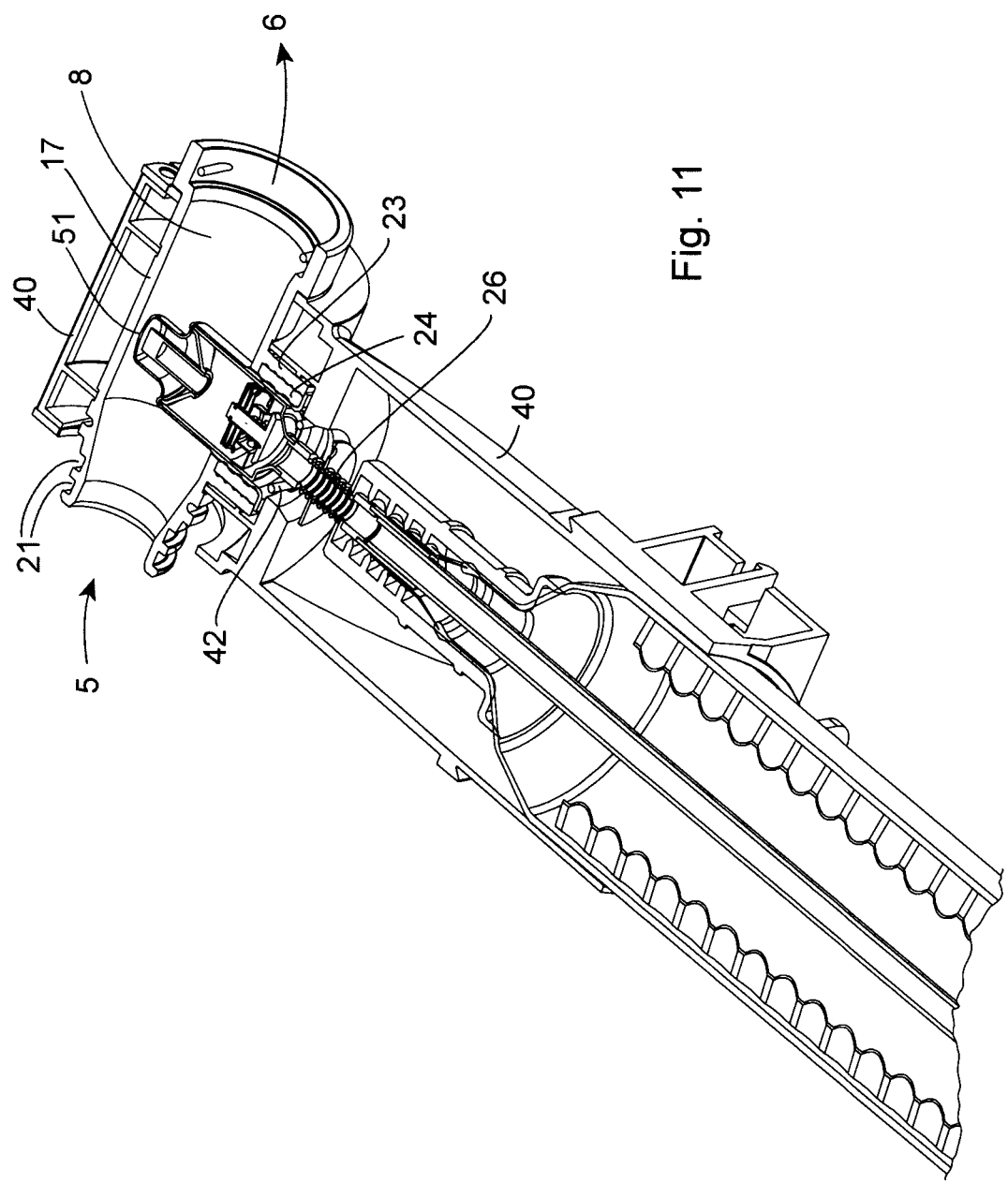
FIG. 11 is a cross-sectional perspective view of FIG. 10 when inserted into the end fitting.

Referring to the drawings a solar collector assembly according to an embodiment of the present invention of the dry heat-pipe type comprises a solar absorbing tube 3 comprising an evacuated radiation transparent enclosure 10 enclosing an absorbing section 11, comprising a radiation absorbing plate 12 for absorbing solar radiation and an elongate tube 13, containing a working fluid (heat transfer medium), in thermal contact with the radiation absorbing plate 12.

The elongate tube 13 contains a thermal transfer fluid to be heated. The elongate tube 13 extends out of one end of the solar absorbing tube 3 and connects with a condenser 16 wherein the thermal transfer fluid when in a vapour phase communicates with a fluid to be heated within an end fitting 17.

An end region of the outer wall of the elongate tube includes a flexible section 26 in the form of a corrugated or convoluted section of tube to provide a degree of flexibility to allow for slight misalignment of the pipe and to absorb shocks or impacts.

The end fitting 17 incorporates a tubular passage 18 which incorporates a cold fluid inlet conduit 19 and a hot fluid outlet conduit 20. The cold fluid inlet conduit 19 and the hot fluid outlet conduit 20 are interchangeable by changing the flow direction of the fluid to be heated through the end fitting 17.

Figure 12:
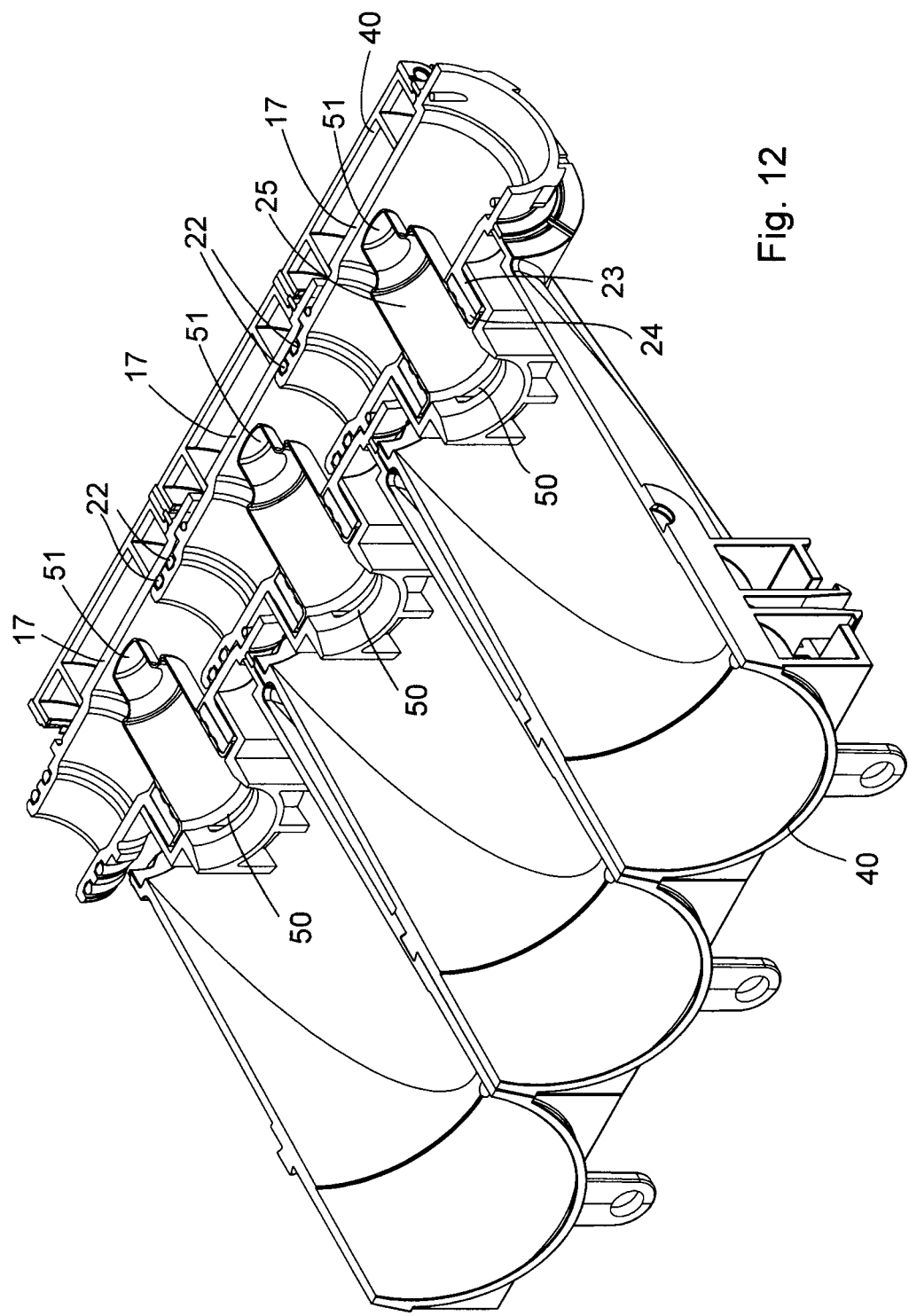
FIG. 12 is a cross sectional view of an assembly of a number of end fittings.

The tubular passage 18 extends transversely across the end fitting 17 and is open at each side of the end fitting whereby a fluid can flow between the tubular passages 18 of adjacent solar tubes 3. The open ends of the passages 18 comprise recesses to provide a circumferential seat 21 for an O-ring 22 or similar sealing means to provide a fluid-tight seal when adjacent end fittings 17 are connected together as illustrated in FIG. 12.

The end fitting 17 is provided with a pipe receiving portion 23 extending orthogonally to the tubular passage 18. The pipe receiving portion 23 is adapted for receiving the condenser 16 of a heat-pipe type solar collector tube 3, a thermal pocket 25 and a sealing gasket 24.

Each heat tube solar tube 3 comprises an evacuated radiation transparent tube 10 enclosing a radiation absorbing plate 12 in thermal contact with an evaporator section 27 of a heat pipe 28, in thermal contact with said radiation absorbing plate 12. The evaporator section 27 is enclosed within the evacuated radiation transparent enclosure 10 to prevent heat loss. Each heat pipe solar tube 3 contains a suitable working fluid.

Each heat pipe includes a condenser section 16 at a distal end of the elongate tube 3 remote from the evaporator section 27, wherein the vaporised working fluid evaporated in the evaporator section 27 is condensed before draining back down into the evaporator section 27.

The condenser section 16 of each heat pipe tube 3 is inserted into a thermal pocket 25 which is open at one end 50 to receive the condenser section 16 and is closed at the opposite end 51. The pocket 25 is sealingly engaged with a sealing gasket 24 within the pipe receiving portion 23 of the end fitting 17, whereby heat transfer can take place between the condenser sections 16 of the heat pipes 3 and a heat transfer fluid (e.g. water) flowing via the flow path 18 in the end-fitting 17. The end fitting 17 includes inlet and outlet openings 19, 20 on either side of the end fitting 17 to allow the heat transfer fluid in the end fitting 17 to be circulated through the chambers of adjacent end fittings. Because the pocket 25 is closed to fluid flow the connection between the solar collector tube is dry—there is no fluid flow through the pocket. Therefore, a solar collector tube can be readily, inserted, removed, and replaced. This is important as it provides enhanced flexibility for maintenance and repair. For example, if one collector tube in a system of multiple tubes is damaged it can be readily removed and replaced without affecting the operation of the other solar collector tube—it is not necessary to cut off fluid flow through the end fittings. The thermal pocket 25 is also readily removable from the fitting. It can be readily replaced without damaging the end fitting or the solar collector tube. Thus, if the thermal pocket 25 is damaged, which could cause leakage of heat exchange fluid, it can be easily removed and replaced.

As shown schematically in FIG. 5 to FIG. 12, the end fitting 17 includes an opening 27 defining a socket to allow the thermal pocket 25 and the sealing gasket 24 to enter the end fitting 17 such that the thermal pocket 25 is immersed in the fluid contained in the end fitting 17 therein. The thermal pocket 25 is sized to allow the condenser section 16 to enter the thermal pocket 25 and to transfer thermal energy from the condenser section 16 to the thermal pocket 25 and into the fluid contained within the end fitting 17. A sealing gasket 24 or similar resilient sealing means is provided around the thermal pocket 25 to form a fluid tight seal in the opening 27 between the thermal pocket 25 and the inner sealing surface of the pipe receiving portion 23.

The sealing means 24 comprises a ring member of resilient polymeric material such as EPDM. The sealing means 24 has a plurality of outer sealing projections for sealing engagement against the outer surface of the thermal pocket 25. The inner face of the sealing means 24 does not necessarily require sealing projections, it may be cylindrical for closely fitting within a seal-receiving recess defined in the socket 27 of the end fitting 17. The thermal pocket 25 has an outer flange 30 to assist in retaining the seal 24 in situ.

The end fitting 17 may be formed from a temperature resistant polymeric material, possibly by injection moulding.

In the invention, there is no fluid flow between the end fitting and the solar collector tube. This greatly simplifies the construction and installation of the collar collector assembly. Solar collector fluid flow is retained within the solar collector and end fitting fluid flow for connection to a user supply is retained within the end fittings. The thermal pocket which is used for thermal connection between the condenser section of the solar collector pipe and the end fitting ensures that the thermal transfer is by heat conduction rather than fluid flow between the end fitting and the solar collector tube. The heat transfer is dry. This also simplifies the replacement of a solar collector tube in situ. The thermal pocket is also readily removable and can be easily replaced, if required.

The solar collector may also comprise a protective casing 40 for receiving an end fitting 17. The end fitting 17 is releasably engagable in the protective casing 40. The protective casing 40 comprises a receiver for receiving a locking clip 42 for securely fixing the condenser section 16 of each heat pipe tube 3 into the thermal pocket 25 of the end fitting 17.

The present invention aims to provide a solar collector having a high efficiency and which can be constructed cheaply, and can readily be assembled and maintained, using less components than prior art devices but using evacuated tubes of the 'dry' heat-pipe type such that the added benefits of both dry-connection and modular technology is accommodated within the assembled collector array.

Modifications and additions can be made to the embodiments of the invention described herein without departing from the scope of the invention. For example, while the embodiments described herein refer to particular features, the invention includes embodiments having different combinations of features. The invention also includes embodiments that do not include all of the specific features described.

The invention is not limited to the embodiments hereinbefore described, with reference to the accompanying drawings, which may be varied in construction and detail.

The invention claimed is:

1. A solar collector comprising a heat pipe having a radiation absorber for absorbing solar radiation and an elongate tube for containing a heat transfer medium, the elongate tube having an evaporator section in thermal contact with the radiation absorber and a condenser section remote from the radiation absorber, the radiation absorber and the evaporator section of said elongate tube being enclosed within an evacuated radiation transparent enclosure and the condenser section being located outside the transparent enclosure, and an end fitting fluidly connecting with a corresponding end fitting of an adjacent heat pipe to enable passage of fluid between the end fittings without requiring a separate manifold, the end fitting comprises a thermal pocket to receive the condenser section of the heat pipe, the thermal pocket is closed to the heat transfer medium flowing through the fluid in the end fitting.

2. A solar collector assembly comprising a plurality of solar collectors as claimed in claim 1.

3. The solar collector as claimed in claim 1 wherein the end fitting comprises a socket to receive the thermal pocket.

4. The solar collector as claimed in claim 3 wherein the thermal pocket comprises a retaining flange.

5. The solar collector as claimed in claim 4 wherein the thermal pocket comprises a cylindrical housing for reception of the condenser section of the heat pipe.

6. The solar collector as claimed in claim 5 wherein the thermal pocket is open at one end to receive the condenser section of the heat pipe and is closed at an opposite end.

7. The solar collector as claimed in claim 6 wherein the condenser section is a tight fit in the thermal pocket for heat transfer from the condenser section to the thermal pocket.

8. The solar collector as claimed in claim 7 wherein the thermal pocket is of a heat conductive material.

9. The solar collector as claimed in claim 8 wherein the thermal pocket is of copper.

10. The solar collector as claimed in claim 9 comprising a seal between the socket of the end fitting and the thermal pocket.

11. The solar collector as claimed in claim 10 wherein the seal comprises a ring member of resilient polymeric material.

12. The solar collector as claimed in claim 11 wherein the seal comprises a plurality of sealing projections.

13. The solar collector as claimed in claim 12 wherein the socket of the end fitting comprises a recess for receiving the seal.

14. The solar collector as claimed in claim 13 wherein the recess is of cylindrical form for reception of a cylindrical seal.

15. The solar collector as claimed in claim 14 wherein the end fitting comprises a fluid passageway, the end fitting being adapted to sealingly engage a similar passageway of an adjacent end fitting.

16. The solar collector as claimed in claim 15 wherein the end fitting comprises a seal for sealingly engaging the passageways of adjacent end fittings.

17. The solar collector as claimed in claim 16 wherein the end fitting comprises a groove or recess to receive an O-ring seal.

* * * * *

UNITED STATES PATENT AND TRADEMARK OFFICE
CERTIFICATE OF CORRECTION

PATENT NO. : 9,494,339 B2
APPLICATION NO. : 13/823488
DATED : November 15, 2016
INVENTOR(S) : John Reid et al.

Page 1 of 1

It is certified that error appears in the above-identified patent and that said Letters Patent is hereby corrected as shown below:

On the Title Page

Item [30], Foreign Application Priority Data:
"20120/0588," should be --2010/0588--.

Signed and Sealed this
Ninth Day of May, 2017

Michelle K. Lee
*Director of the United States Patent and Trademark Office*